US011825007B2

United States Patent
Lim et al.

(10) Patent No.: US 11,825,007 B2
(45) Date of Patent: Nov. 21, 2023

(54) COMPONENT STACK MOUNTING STRUCTURE AND ELECTRONIC DEVICE INCLUDING SAME

(71) Applicant: Samsung Electronics Co., Ltd., Suwon-si (KR)

(72) Inventors: Jinho Lim, Suwon-si (KR); Gyeongtae Kim, Suwon-si (KR); Yonghwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 17/248,617

(22) Filed: Jan. 29, 2021

(65) Prior Publication Data

US 2021/0243291 A1 Aug. 5, 2021

(30) Foreign Application Priority Data

Feb. 4, 2020 (KR) .................. 10-2020-0012898

(51) Int. Cl.
*H04M 1/02* (2006.01)
(52) U.S. Cl.
CPC ....... *H04M 1/0274* (2013.01); *H04M 1/0264* (2013.01); *H04M 1/0277* (2013.01); *H04M 2250/12* (2013.01)
(58) Field of Classification Search
None
See application file for complete search history.

(56) References Cited

U.S. PATENT DOCUMENTS

| 2009/0298541 | A1 | 12/2009 | Roh et al. |
| 2011/0038401 | A1 | 2/2011 | Demuynck et al. |
| 2019/0012544 | A1* | 1/2019 | Park ................. G06V 40/19 |
| 2019/0104212 | A1 | 4/2019 | Lee et al. |
| 2019/0208045 | A1* | 7/2019 | Xie ................. H04M 1/0266 |
| 2020/0288004 | A1* | 9/2020 | Ren ................. G06F 3/041 |

(Continued)

FOREIGN PATENT DOCUMENTS

| CN | 108512964 A | 9/2018 |
| JP | 2011-096926 A | 5/2011 |

(Continued)

OTHER PUBLICATIONS

International Search Report dated May 10, 2021 in connection with International Patent Application No. PCT/KR2021/001281, 3 pages.

(Continued)

*Primary Examiner* — Quoc D Tran

(57) ABSTRACT

An electronic device according to various embodiments may include a display, a main board, a component connector, a supporting member, and a sensor module. The main board is disposed under the display. The component connector is disposed on a surface of the main board. The supporting member is configured to surround at least two side surfaces of the component connector and is disposed on the surface of the main board. The sensor module includes a sensor that faces at least a portion of the component connector. The sensor module also includes a sensor substrate that is stacked with the sensor and attached to the supporting member. The sensor substrate may be separably connected to the supporting member.

20 Claims, 12 Drawing Sheets

(56) References Cited

U.S. PATENT DOCUMENTS

2020/0366822 A1* 11/2020 Yang .................. H04M 1/0264
2021/0044684 A1* 2/2021 Baek .................. H04M 1/0277

FOREIGN PATENT DOCUMENTS

| KR | 10-1997-0700948 A | 2/1997 |
| KR | 10-2009-0124026 A | 12/2009 |
| KR | 10-2014-0002286 A | 1/2014 |

OTHER PUBLICATIONS

Written Opinion of the International Searching Authority dated May 10, 2021 in connection with International Patent Application No. PCT/KR2021/001281, 5 pages.

* cited by examiner

COMPONENT STACK MOUNTING STRUCTURE AND ELECTRONIC DEVICE INCLUDING SAME

CROSS-REFERENCE TO RELATED APPLICATION

This application is based on and claims priority under 35 U.S.C. 119 to Korean Patent Application No. 10-2020-0012898, filed on Feb. 4, 2020, in the Korean Intellectual Property Office, the disclosure of which is herein incorporated by reference in its entirety.

BACKGROUND

1. Field

Various embodiments relate to a component stack mounting structure and an electronic device including the same.

2. Description of Related Art

Electronic devices may output stored information as sounds or images. In line with a high degree of integration of electronic devices and widespread use of super-fast/large-capacity wireless communication, a single electronic device (for example, a mobile communication terminal) may recently be equipped with various functions. For example, not only a communication function, but also an entertainment function (for example, gaming), a multimedia function (for example, music/moving image playback), communication and security functions for mobile banking and the like, a scheduling function, or an electronic wallet function may be integrated in a single electronic device. Various components for providing such integrated functions are mounted on circuit boards of electronic devices, and the mounting space efficiency has accordingly been considered increasingly important.

SUMMARY

Among hardware (HW) components mounted inside an electronic device, components having large sizes (for example, a component connector, a sensor module, and the like) and/or components that require spacing between components require a large-scale mounting space compared with other components, thereby exposing the limit of existing mounting technologies. As another example, HW components mounted inside an electronic device may be simply arranged on the same plane, thereby degrading the space utilization efficiency.

An electronic device according to various embodiments may have a mounting space secured therein.

An electronic device according to various embodiments may include: a display; a main board disposed under the display; a component connector disposed on a surface of the main board; a supporting member configured to surround at least two side surfaces of the component connector and disposed on the surface of the main board; and a sensor module including a sensor facing at least a portion of the component connector and a sensor substrate stacked with the sensor and attached to the supporting member. The sensor substrate may be separably connected to the supporting member.

An electronic device according to various embodiments may include: a main board; a connection member disposed on a surface of the main board and electrically connected to the main board; a substrate disposed on or above the connection member; a supporting member disposed on the surface of the main board so as to surround at least two side surfaces of the connection member and configured to support the substate; and an electric component electrically connected to the substrate.

An electronic device according to various embodiments may include: a housing; a display disposed in the housing and including a first surface facing a first direction and a second surface facing a second direction that is an opposite direction to the first direction; a first plate disposed to face the second surface of the display and including a third surface facing the first direction; a connector disposed on the third surface of the first plate; a supporting member disposed on the third surface to surround at least a portion of the connector; a sensor facing at least a portion of the connector; and a second plate disposed between the sensor and the supporting member. The second plate may be disposed to be separable from the supporting member.

An electronic device according to various embodiments may include: a display; a printed circuit board disposed under the display and including a first section in which a connector is formed and a second section formed around the first section; a camera connector disposed between the display and the printed circuit board and electrically coupled to the connector disposed in the first section; a supporting member including at least two walls disposed in the second section and spaced apart from the camera connector to surround at least two side surfaces of the camera connector and a first opening configured to provide a passage of a flexible circuit board extending from the camera connector; a sensor substrate disposed on the camera connector and the supporting member and bonded to the supporting member; a sensor coupled on the sensor substrate and facing the display; a bracket configured to form a first space in which the sensor is disposed and a second space separated from the first space and adjacent to the sensor; and an adhesive member bonded to the bracket around the second space to seal at least a portion of the second space.

An electronic device according to various embodiments may have electric components mounted therein by using a space on the periphery of a component connector, thereby improving the degree of freedom in connection with the design inside the electronic device.

According to various embodiments, a support member may be disposed on the periphery of a component connector inside an electronic device, thereby providing a separate space in which the component connector is mounted, and a substrate and an electric component may be disposed on the support member such that they are mounted while being stacked with the component connector.

According to various embodiments, an electric component may be stacked/mounted on a component connector inside an electronic device, and the space that has been used for the electric component may be used to mount another component or used as the sound space of a speaker or a receiver.

According to various embodiments, a substrate of an electric component may be disposed on a component connector electrically connected to a main board, and the space of distancing between the component connector and the substrate may be designed to have a designated distance or less, thereby preventing the component connector from being electrically disconnected without using a separate structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 14C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
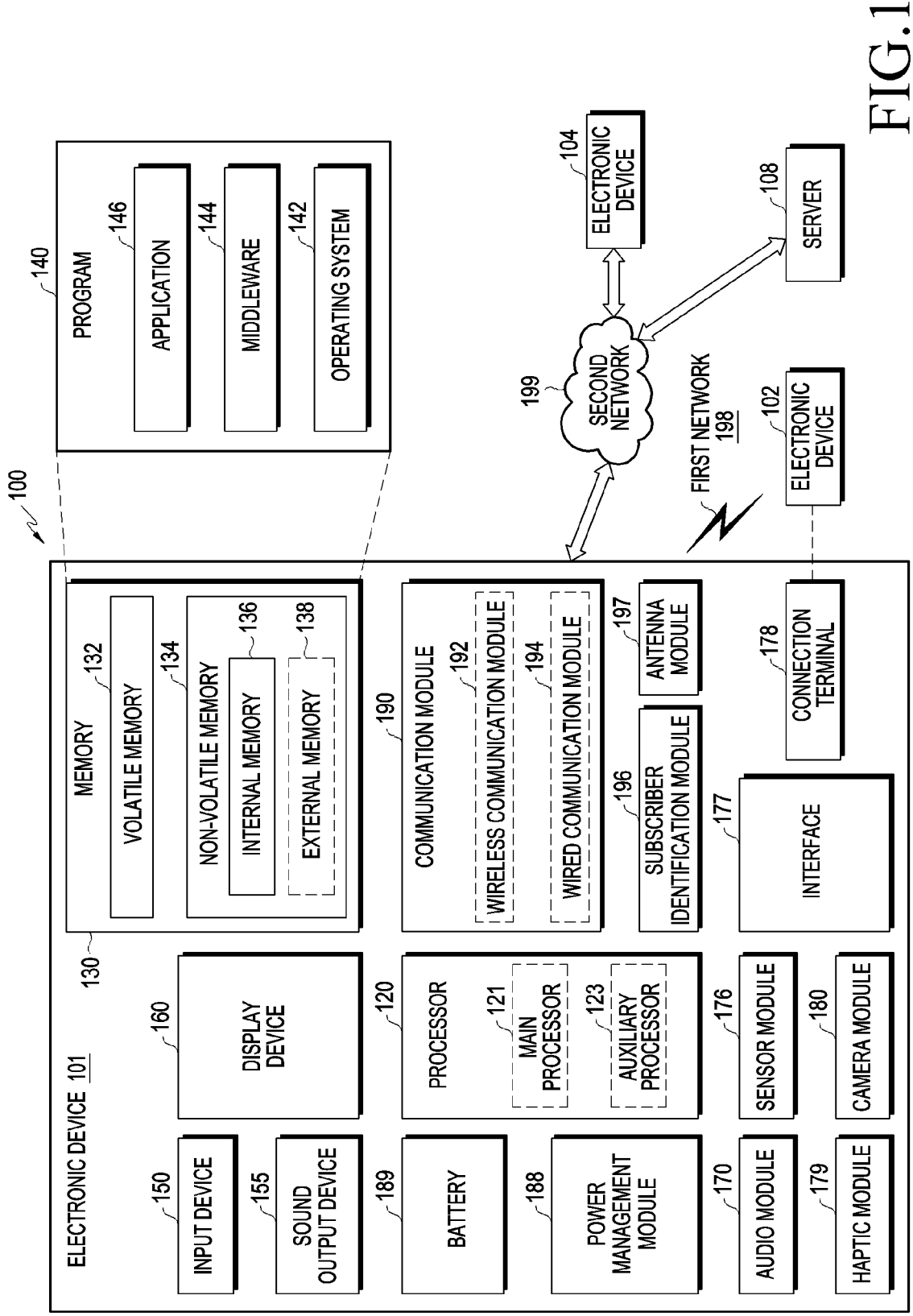
FIG. 1 illustrates a block diagram of an electronic device in a network environment according to various embodiments.

FIG. 1 illustrates a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
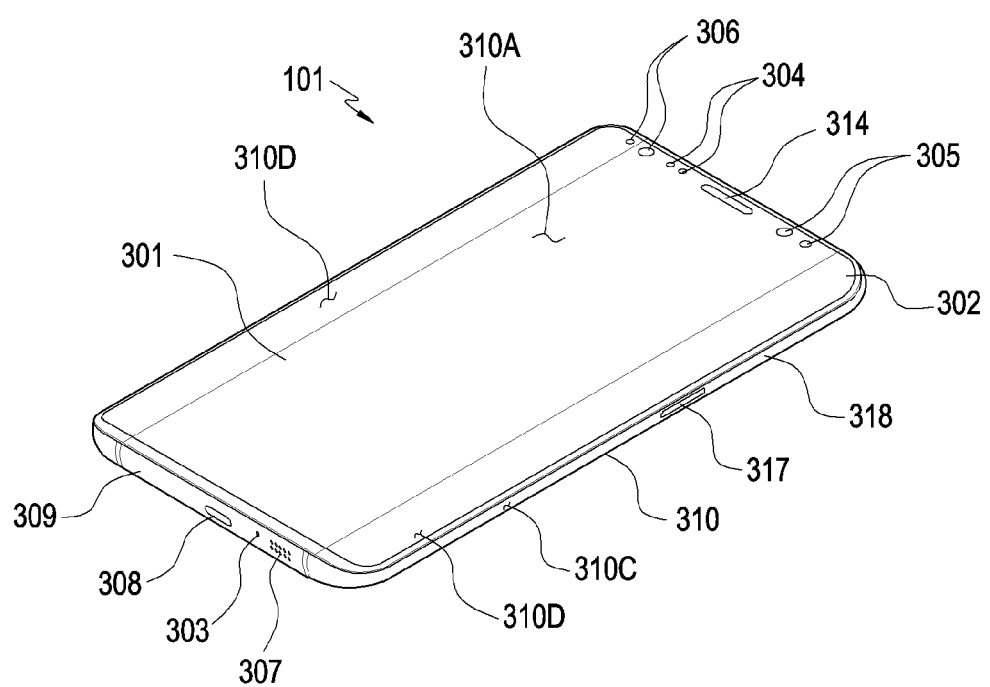
FIG. 2 illustrates a front perspective view of the electronic device according to various embodiments.
Figure 3:
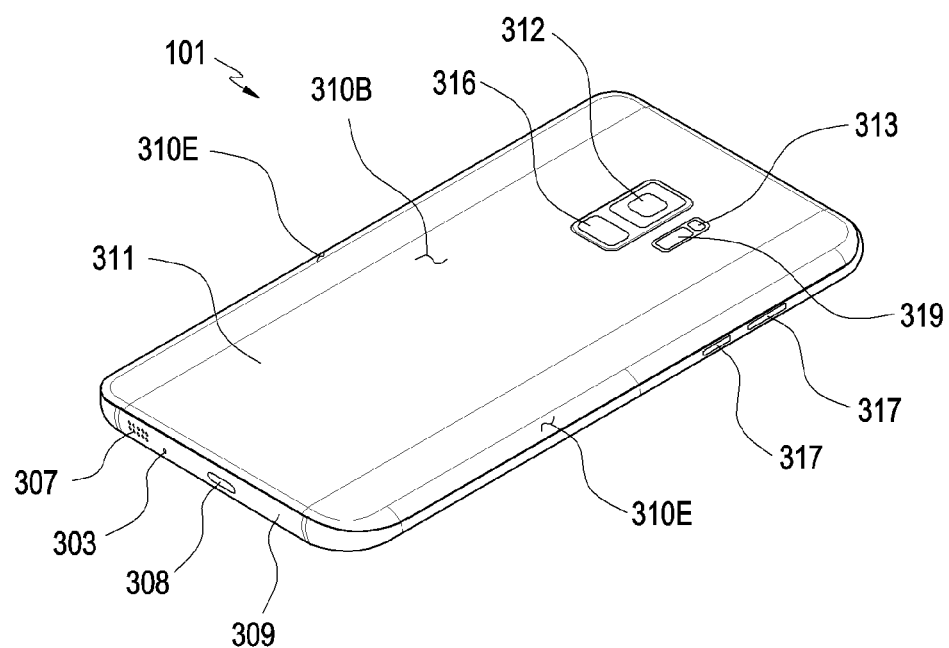
FIG. 3 illustrates a rear perspective view of the electronic device according to various embodiments.

FIG. 2 illustrates a front perspective view of an electronic device 101 according to various embodiments. FIG. 3 illustrates a rear perspective view of the electronic device 101 according to various embodiments.

Referring to FIGS. 2 and 3, an electronic device 101 according to an embodiment may include a housing 310 having a first surface (or a front surface) 310A, a second surface (or a rear surface) 310B, and side surfaces 310C surrounding the space between the first surface 310A and the second surface 310B. In another embodiment (not shown), the housing may mean a structure forming some of the first surface 310A, the second surface 310B, and the side surfaces 310C shown in FIG. 3. According to an embodiment, the first surface 310A may be at least partially substantially formed by a transparent front plate 302 (e.g., a glass plate or a polymer plate). The second surface 310B may be substantially formed by an opaque rear plate 311. The rear plate 311, for example, may be made of coated or colored glass, ceramic, a polymer, metal (e.g., aluminum, stainless steel (STS), or magnesium), or a combination of at least two of these materials. The side surfaces 310C are combined with the front plate 302 and the rear plate 311 and may be formed by a lateral bezel structure 318 (or a "lateral member") including metal and/or a polymer. In an embodiment, the rear plate 311 and the lateral bezel structure 318 may be integrated and may include the same material (e.g., a metallic material such as aluminum).

In the embodiment shown in the figures, the front plate 302 may have two first sections 310D, which bend and seamlessly extend toward the rear plate 311 from the first surface 310A, at both long edges of the front plate 302. In the shown embodiment (referring to FIG. 3), the rear plate 311 may have two second sections 310E, which bend and seamlessly extend toward the front plate 302 from the second surface 310B, at both long edges. In an embodiment, the front plate 302 (or the rear plate 311) may have only one of the first sections 310D (or the second sections 310E). In another embodiment, some of the first sections 310D or the second sections 310E may not be included. In the embodiments, when seen from a side surface of the electronic device 101, the lateral bezel structure 318 may have a first thickness (or width) at the side surfaces not including the first sections 310D or the second sections 310E and may have a second thickness smaller than the first thickness at the side surfaces including the first sections 310D or the second sections 310E.

According to an embodiment, the electronic device 101 may include at least one or more of a display 301, audio modules 303, 307, and 314, sensor modules 304, 316, and 319, camera modules 305, 312, 113, key input devices 317, a light emitting element 306, and a connector holes 308. In an embodiment, the electronic device 101 may not include at least one (e.g., the key input devices 317 or the light emitting element 306) of the components, or may further include other components.

According to an embodiment, the display 301, for example, may be visually exposed through a large portion of the front plate 302. In an embodiment, at least a portion of the display 301 may be exposed through the front plate 302 forming the first surface 310A and the first sections 310D of the side surfaces 310C. In an embodiment, the edge of the display 301 may be formed substantially in the same shape as the adjacent outline shape of the front plate 302. In another embodiment (not shown), in order to enlarge the exposed area of the display 301, the gap between the outline of the display 301 and the outline of the front plate 302 may be substantially uniform.

In another embodiment (not shown), in a portion of a display region of the display 301, a recess or an opening may be formed and at least one or more of the audio module 314, the sensor module 304, the camera module 305, and the light emitting element 306 aligned with the recess or the opening may be included. In another embodiment (not shown), at least one or more of the audio module 314, the sensor module 304, the camera module 305, the fingerprint sensor 316, and the light emitting element 306 may be disposed on the rear surface of the display region of the display 301. In another embodiment, the display 301 may be combined with or disposed adjacent to a touch sensing circuit, a pressure sensor that can measure the intensity (pressure) of a touch, and/or a digitizer that detects a magnetic stylus pen. In an embodiment, at least some of the sensor modules 304 and 519 and/or at least some of the key input devices 317 may be disposed in the first sections 310D and/or the second sections 310E.

According to an embodiment, the audio modules 303, 307, and 314, for example, may include a microphone hole 303 and speaker holes 307 and 314. A microphone for capturing external sounds may be disposed in the microphone hole 303, and in an embodiment, a plurality of microphones may be disposed therein to sense directions of sounds. The speaker holes 307 and 314 may include an external speaker hole 307 and a receiver hole 314 for a telephone call. In an embodiment, the speaker holes 307 and 314 and the microphone hole 303 may be integrated into one hole or a speaker (e.g., a piezo speaker) may be included without the speaker holes 307 and 314. The audio modules 303, 307, and 314 are not limited to the structure described above, and the design thereof may be changed in various ways such as mounting only some audio modules or adding a new audio module, depending on the structure of the electronic device 101.

According to an embodiment, the sensor modules 304, 316, and 319 can produce an electrical signal or a data value corresponding to the internal operation state of the electronic device 101 or an external environmental state. The sensor modules 304, 316, and 319, for example, may include a first sensor module 304 (e.g., a proximity sensor) and/or a second sensor module (not shown) (e.g., a fingerprint sensor) disposed on the first surface 310A of the housing 310, and/or a third sensor module 319 (e.g., an HRM sensor) and/or a fourth sensor module 316 (e.g., a fingerprint sensor) disposed on the second surface 310B of the housing 310. The fingerprint sensor may be disposed not only on the first surface 310A (e.g., the display 301), but also on the second surface 310B of the housing 310. The electronic device 101 may further include a sensor module (not shown), for example, at least one of a gesture sensor, a gyro sensor, a barometer sensor, a magnetic sensor, an acceleration sensor, a grip sensor, a color sensor, an IR (Infrared) sensor, a biosensor, a temperature sensor, a humidity sensor, or an illumination sensor 304. The sensor modules 304, 316, and 319 are not limited to the structure described above, and the design thereof may be changed in various ways such as mounting only some sensor modules or adding a new sensor module, depending on the structure of the electronic device 101.

According to an embodiment, the camera modules 305, 312, and 313, for example, may include a first camera 305 disposed on the first surface 310A of the electronic device 101, and a second camera 312 and/or a flash 313 disposed on the second surface 310B. The camera modules 305 and 312 may include one or more lenses, an image sensor, and/or an image signal processor. A flash 313, for example, may include a light emitting diode or a xenon lamp. In an embodiment, two or more lenses (an infrared camera, a wide-angle lens, and a telephoto lens) and image sensors may be disposed on one surface of the electronic device 101. The camera modules 305, 312, and 313 are not limited to the structure described above, and the design thereof may be changed in various ways such as mounting only some camera modules or adding a new camera module, depending on the structure of the electronic device 101.

According to an embodiment, the key input devices 317, for example, may be disposed on the side surfaces 310C of the housing 310. In another embodiment, the electronic device 101 may not include some or all of the key input devices 317 described above and the non-included key input devices 317 may be implemented in other types such as software keys on the display 301. In an embodiment, the key input devices may include a sensor module 316 disposed on the second surface 310B of the housing 310.

According to an embodiment, the light emitting element 306, for example, may be disposed on the first surface 310A of the housing 310. The light emitting element 306, for example, may provide state information of the electronic device 101 in a light type. In another embodiment, the light emitting element 306, for example, may provide a light source that operates with the operation of the camera module 305. The light emitting element 306, for example, may include an LED, an IR LED, and a xenon lamp.

According to an embodiment, the connector hole 308 may include a first connector hole 308 that can accommodate a connector (e.g., a USB connector) for transmitting and receiving power and/or data to and from external electronic devices and/or a second connector hole (or an earphone jack) (not shown) that can accommodate a connector for transmitting and receiving audio signals to and from external electronic devices. The connector holes 308 are not limited to the structure described above, and the design thereof may be changed in various ways such as mounting only some connector holes or adding a new connector hole, depending on the structure of the electronic device 101.

Figure 4:
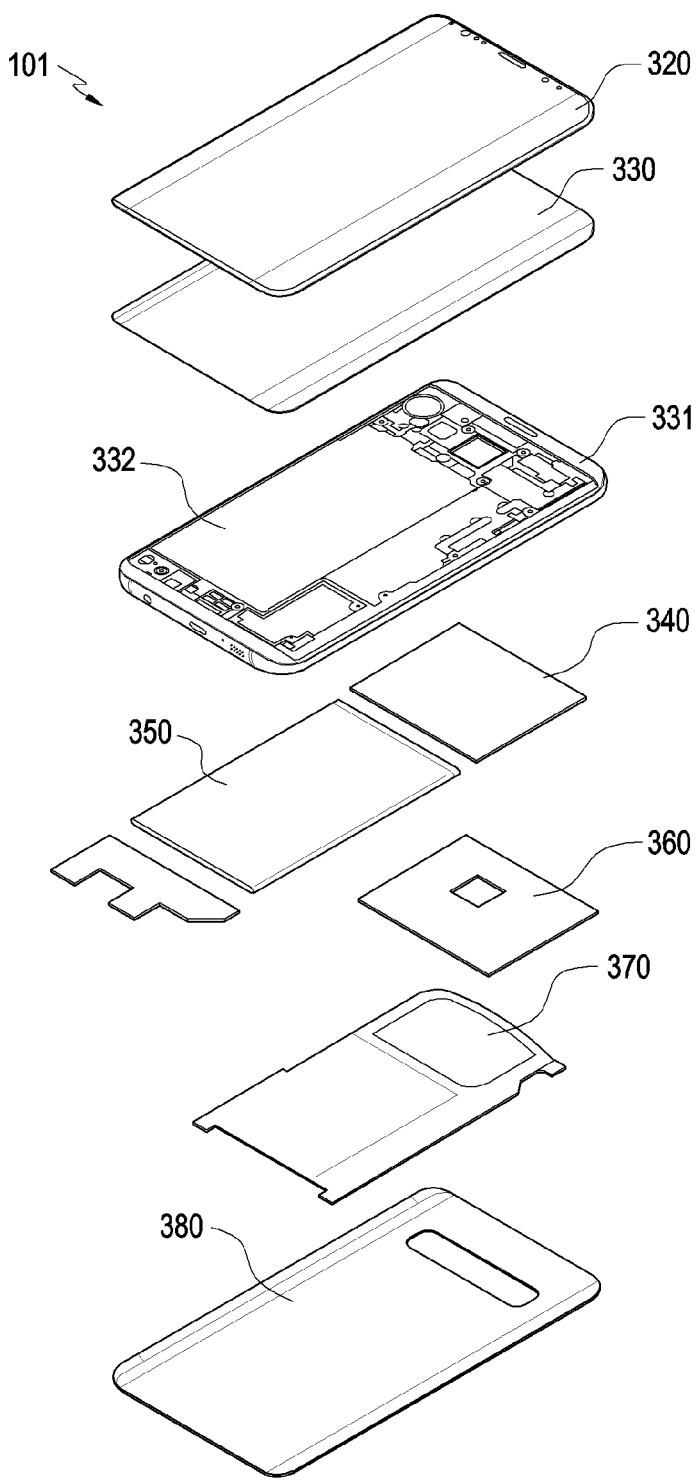
FIG. 4 illustrates an exploded perspective view of an electronic device according to various embodiments.

FIG. 4 illustrates an exploded perspective view showing an electronic device 101 according to various embodiments.

Referring to FIG. 4, an electronic device 101 according to various embodiments (e.g., the electronic device 101 shown in FIGS. 1 to 3) may include a lateral bezel structure 331, a first member 332 (e.g., a bracket), a front plate 320, a display 330, a printed circuit board 340, a battery 350, a second member 360 (e.g., a rear case), an antenna 370, and a rear plate 380. In an embodiment, the electronic device 101 may not include at least one (e.g., the first member 332 or the second member 360) of the components, or may further include other components. At least one of the components of the electronic device 101 may be the same as or similar to at least one of the electronic device 101 shown in FIG. 2 or FIG. 3, and repeated description is omitted below.

According to various embodiments, the first member 332 is disposed in the electronic device 101 and may be connected with the lateral bezel structure 331 or may be integrated with the lateral bezel structure 331. The first member 332, for example, may be made of a metallic material and/or a non-metallic material (e.g., a polymer). The display 330 may be coupled to a surface of the first member 332 and the printed circuit board 340 may be coupled to the other surface of the first member 332. A processor, a memory, and/or an interface may be mounted on the printed circuit board 340. The processor, for example, may include one or more of a CPU, an application processor, a graphic processor, an image signal processor, a sensor hub processor, or a communication processor.

According to various embodiments, the memory, for example, may include a volatile memory or a nonvolatile memory.

According to various embodiments, the interface may include a High Definition Multimedia Interface (HDMI), a Universal Serial Bus (USB) interface, an SD card interface, and/or an audio interface. The interface, for example, can electrically or physically connect the electronic device 101 to external electronic devices and may include an USB connector, an SD card/MMC connector, or an audio connector.

According to various embodiments, the battery 350, which is a device for supplying power to at least one component of the electronic device 101, for example, may include a primary battery that is not rechargeable, a secondary battery that is rechargeable, or a fuel cell. At least a portion of the battery 350, for example, may be disposed in substantially the same plane as the printed circuit board 340. The battery 350 may be integrally disposed in the electronic device 101 and may be detachably attached to the electronic device 101.

According to various embodiments, the antenna 370 may be disposed between the rear plate 380 and the battery 350. The antenna 370, for example, may include a Near Field Communication (NFC) antenna, a wireless charging antenna, and/or a Magnetic Secure Transmission (MST) antenna. The antenna 370, for example, can perform near field communication with external devices or can wirelessly transmit and receive power for charging. In another embodiment, an antenna structure may be formed by a portion or a combination of the lateral bezel structure 331 and/or the first member 332.

Figure 5:
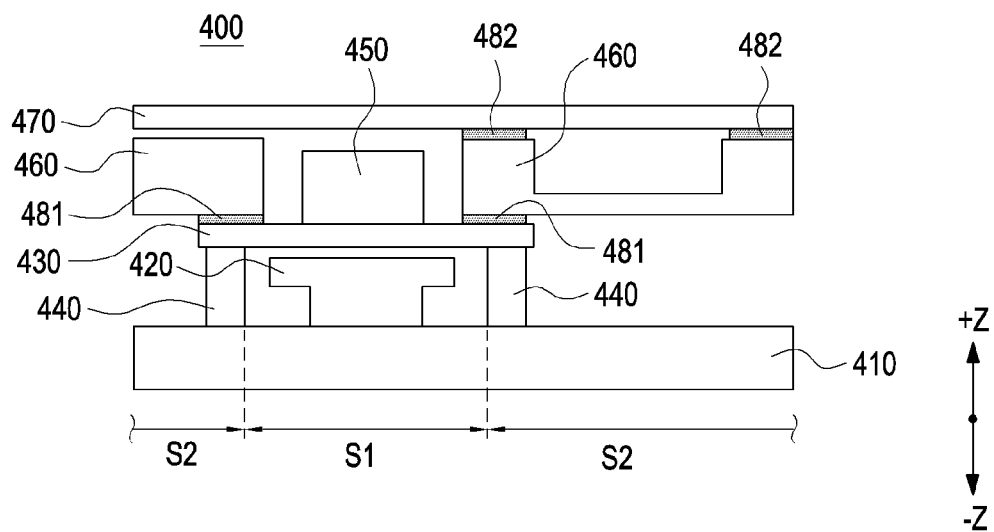
FIG. 5 illustrates a cross-sectional view showing a stack mounting structure of electronic device components according to various embodiments.

FIG. 5 illustrates a cross-sectional view showing a stack mounting structure of electronic device components according to various embodiments.

According to various embodiments, an electronic device (e.g., the electronic devices 101 shown in FIGS. 1 to 4) may include a component stack mounting structure including various components stacked therein. For example, the electronic device 101 may include a main board 410 (e.g., the printed circuit board 340 shown in FIG. 4), a connection member 420 (e.g., the component connector 421 shown in FIG. 8), a substrate 430, a supporting member 440, an electric component 450 (e.g., the sensor 511 shown in FIG. 8). As another example, the electronic device 101 may include a bracket 460 (e.g., the housing 310 shown in FIGS. 2 and 3 or the first member 332 shown in FIG. 4) and a display 470 (e.g., the display 330 shown in FIG. 4). As another example, a plurality of adhesive members 481 and 482 for bonding the stacked components may be disposed in the electronic device 101.

In FIG. 5, 'Z' of the biaxial orthogonal coordinate system may indicate the thickness direction of the electronic device 101. In an embodiment, 'Z' may indicate a first direction (+Z) and a second direction (−Z).

According to an embodiment, the main board 410 may have a first section S1 in which the connection member 420 is disposed and a second section S2 that is the peripheral section of the first section S1, and various different or same components may be stacked on the first section S1 or the second section S2.

According to an embodiment, the connection member 420, the substrate 430, the electric component 450, and a partial region the display 470 may be sequentially stacked in the first direction (+Z) in the first section S1 of the main board 410. The connection member 420 may be disposed in electrical contact with the main board 410 and the substrate 430 may be disposed above or on the connection member 420. For example, the connection member 420 and the substrate 430 may be in contact with each other or may be spaced a predetermined distance apart from each other. The electric component 450 is mounted on the substrate 430 and can transmit or receive various signals.

According to an embodiment, the supporting member 440, the substrate 430, the bracket 460, and the other partial region of the display 470 may be sequentially stacked in the first direction (+Z) in the second section S2 of the main board 410. The supporting member 440 may have a height the same as or larger than the height of the connection member 420 and may be disposed on the second section S2 around the connection member 420 to surround at least one side surface of the connection member 420. The supporting member 440 may be disposed on the rear surface facing the second direction (−Z) of the substrate 430 to support the substrate 430 and may be designed to be separable from the substrate 430, depending on work by a user. The supporting member 440 and the substrate 430 may be attached by a specific adhesive member. The bracket 460 may be disposed on the substrate 430 to surround at least one side surface of the electric component 450 and may be attached by a first adhesive member 481. The display 470 disposed on the front surface facing the first direction (+Z) of the bracket 460 may be coupled to a portion of the bracket 460 by a second adhesive member 482.

According to an embodiment, a space in which various electric components are mounted can be provided by the component stack mounting structure 400. For example, the connection member 420 and the electric component 450 may be stacked up and down with the substrate 430 therebetween. According to the component stack mounting structure 400, one space in which the connection member 420 is mounted can be provided by the main board 410, the supporting member 440, and the substrate 430 and another one space in which the electric component 450 is mounted can be provided by the display 470, the bracket 460, and the substrate 430. As another example, the bracket 460 can provide a separate space in which an electric component different from the electric component 450 is disposed or that forms a sound channel in cooperation with the display 470 and the second adhesive member 482.

Figure 6:
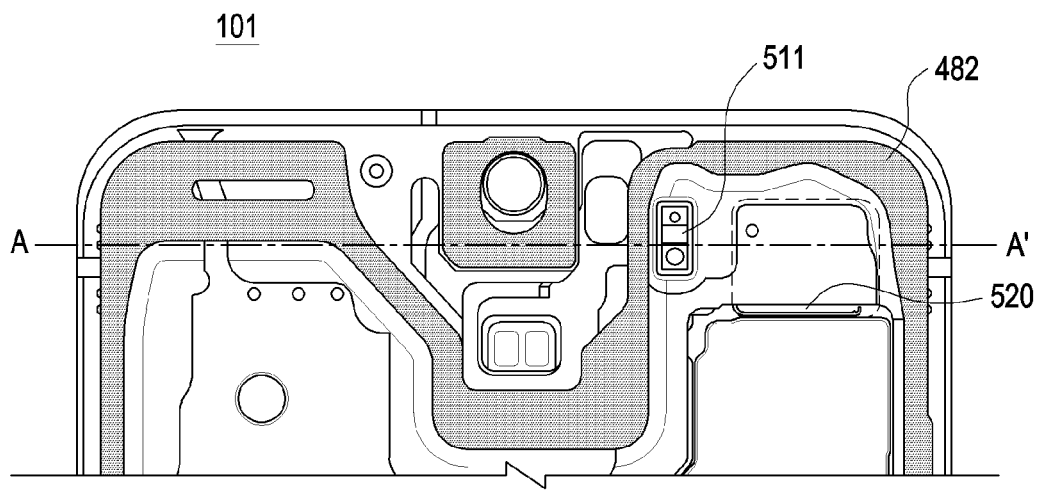
FIG. 6 illustrates a front view showing the disposition relationship of internal components without a display in an electronic device according to one of various embodiments.
Figure 7:
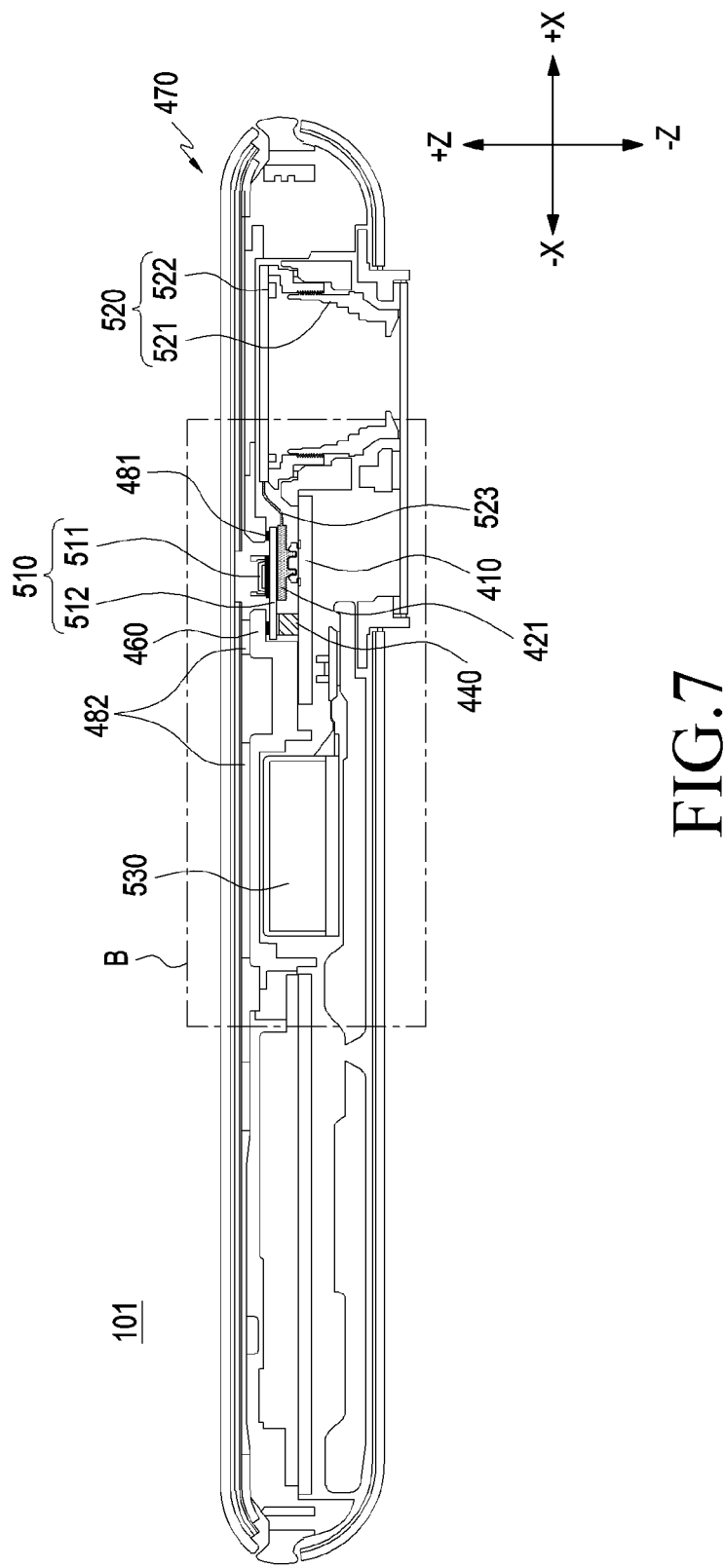
FIG. 7 illustrates a cross-sectional view taken along line A-A' shown in FIG. 6.

FIG. 6 illustrates a front view showing the disposition relationship of internal components without a display in an electronic device according to one of various embodiments. FIG. 7 illustrates a cross-sectional view taken along line A-A' shown in FIG. 6 and FIG. 8 illustrates an enlarged cross-sectional view of a section (e.g., section B) shown in FIG. 7.

According to various embodiments, an electronic device 101 (e.g., the electronic device 101 shown in FIGS. 1 to 3) may include a display 470, a main board 410 disposed under the display 470, a component connector 421 disposed on a surface of the main board 410, a supporting member 440 formed to surround at least two side surfaces of the component connector 421 and disposed on the surface of the main board 410, a sensor 511 facing at least a portion of the component connector 421, and a sensor module 510 including a sensor substrate 512, which is stacked over the sensor 511, and supported by the supporting member 440. The sensor substrate 512 is attached to the supporting member 440 and can be separated for replacement of the component connector 421. As another example, the electronic device 101 may include a bracket 460 for forming a first space P2 in which the sensor 511 is disposed and a second space P2 that is separated from the first space P1 and adjacent to the sensor 511. As another example, the electronic device 101 may include a first adhesive member 481 for forming the first space P1 and a second adhesive member 482 for forming the second space P2.

Figure 8:
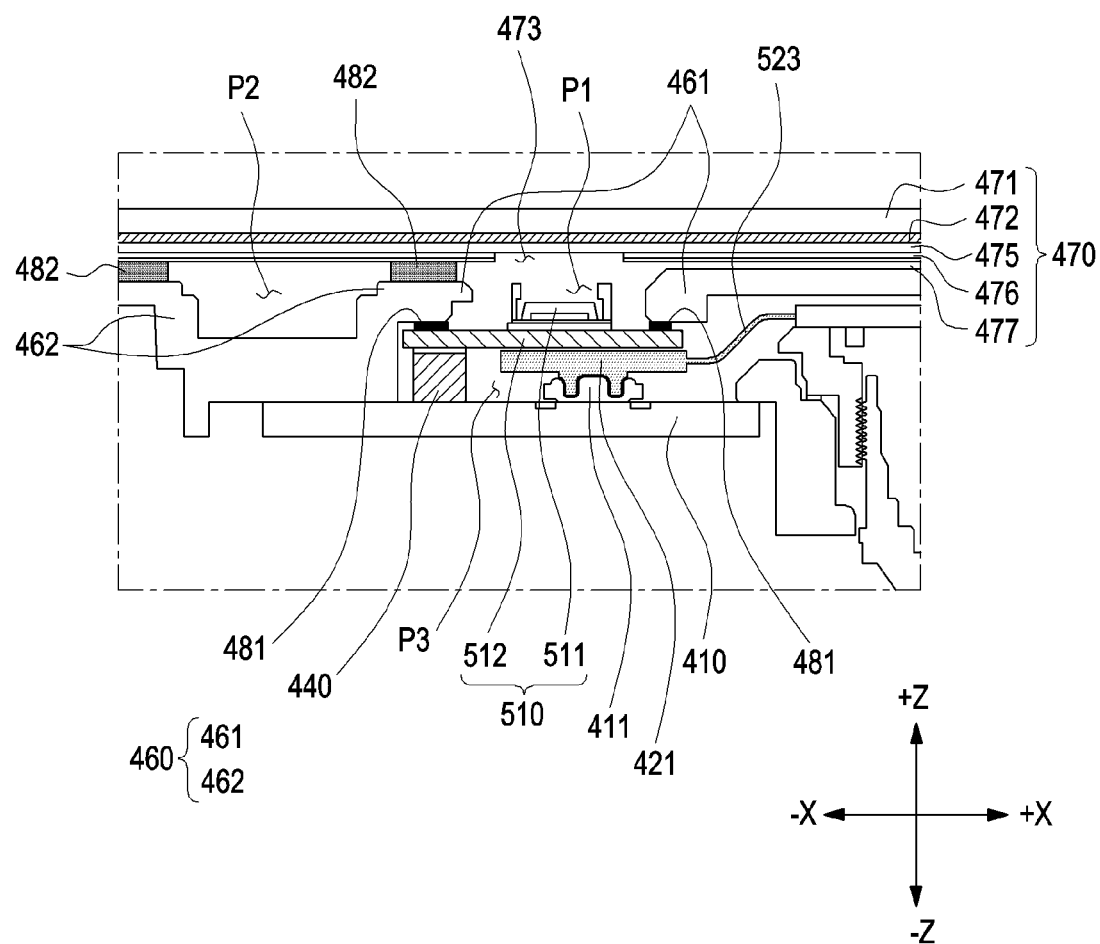
FIG. 8 illustrates an enlarged cross-sectional view of a section (e.g., section B) shown in FIG. 7.

The structures of the display 470, the main board 410, the component connector 421, the supporting member 440, and the sensor module 510 shown in FIGS. 6 to 8 may be partially or entirely the same as the structures of the display 470, the main board 410, the connection member 420, the supporting member 440, the substrate 430, and the electric component 450 shown in FIG. 5.

In FIGS. 7 and 8, 'X' of the biaxial orthogonal coordinate system may indicate the width direction of the electronic device 101 and 'Z' thereof may indicate the thickness direction of the electronic device 101. In an embodiment, 'Z' may indicate a first direction (+Z) and a second direction (−Z) and 'X' may indicate a third direction (+X or −X).

According to various embodiment, the display 470 may be disposed to face a front surface (e.g., the first direction (+Z)), and a transparent member 471, a display panel 472 disposed under the transparent member 471, an auxiliary layer (e.g., a polymer layer 475, a light-blocking member 476, and a heat-blocking layer 477) disposed under the display panel 472 may be sequentially arranged.

According to an embodiment, the transparent member 471 (e.g., a window) may have a region that substantially provides an image and/or a video to a user through the display panel 472. As another example, the display panel 472 may be exposed to the front through the transparent member 471 and may include a display element layer including at least one pixel, for example, an (active) organic light emitting diode. According to an embodiment, an optical member and/or a touch sensor panel may be disposed between the transparent member and the display element layer or in the display element layer. For example, the display panel 472 is an output device that output images, and may be used as an input device having a touch screen function.

According to an embodiment, the polymer layer 475, the light-blocking member 476, and/or the heat-blocking layer 477 may be sequentially disposed under the display panel 472. The light-blocking member 682 may be provided as a layer shielding the rear surface of the display 470, for example, may be a cushion member, an embossing member, or a copper (CU) sheet, and may have a black color. The heat-blocking layer 477 can block heat produced by the display panel 472 or can prevent heat produced by a wireless communication circuit from transferring to the display panel 472. The heat-blocking layer 477 may include a graphite material. At least auxiliary layer (e.g., the light-blocking member 476 and/or the heat-blocking layer 477) disposed under the display panel 472 has an opening 473 in the region facing the sensor module 510, thereby being able to provide a passage through which a signal (e.g., an optical signal) to be transmitted to the sensor module 510 can pass.

According to various embodiments, the main board 410 may be disposed under the display 470. For example, the main board 410 may be the main printed circuit board 340 shown in FIG. 4, and the processor, the memory, and/or the interface shown in FIG. 1 may be mounted on the main board 410. Another component (e.g., the connector 411 for connection with the component connector 421) is disposed in a region of the main board 410 and can transmit power, communication, and various circuit signals.

According to various embodiments, the component connector 421 may be disposed on a surface of the main board 410 to be electrically connected with the connector 411 of the main board 410. The component of the component connector 421 may be a camera module 520. For example, the camera module 520 is a single component, but when a plurality of camera modules is provided, each of the camera modules 520 may include a lens assembly including a plurality of lenses disposed to face the rear surface of the electronic device 101 (e.g., the second direction (−Z)), a barrel 521 including the lens assembly, and a substrate 522 on which an image sensor, etc. are mounted. As another example, the camera module 520 may include the component connector 421 extending toward the main board 410 from the substrate 522. As another example, most components of the sensor module 510 such as the lens assembly and the image sensor have a thickness over ½ of the thickness of the electronic device 101, they may be adjacently disposed not to overlap the main board 410 and the component connector 421 may be extended to a separate flexible circuit board 523 and positioned on the main board 410.

According to an embodiment, the component connector 421 may be a B-to-B connector or a ZIP connector and may be electrically connected with the connector 411 mounted on the main board 410 in a snap-fit type. A sensor substrate 512 disposed on the component connector 421 may be adjacently positioned at a predetermined or less distance to prevent the component connector 421 from separating from or coming off from the main board 410.

According to various embodiments, the supporting member 440 may be formed to surround at least two side surfaces of the component connector 421 and may be disposed on a surface facing the first direction (+Z) of the main board 410. As another example, the supporting member 440 may form at least a portion of the space (e.g., a third space P3) in which the component connector 421 is mounted, and at least one opening may be formed in the region facing the front surface that the component connector 421 faces. As another example, the supporting member 440 may have a separate opening for providing a passage that the flexible circuit board 523 extending from the component connector 421 passes.

According to an embodiment, the supporting member 440 can support the edge regions of the sensor substrate 512 and can maintain the space in which the connector component such as the connection member 420 is positioned. For example, the supporting member 440 is designed to have a predetermined height (thickness) and is coupled to the sensor substrate 512 by an adhesive member, thereby being able to provide a space (e.g., the third space P3) preventing the connector component such as the connection member 420 from moving a predetermined distance or more in the first direction (+Z) (e.g., toward the sensor substrate 512).

According to an embodiment, the supporting member 440 may be disposed between the sensor substrate 512 and the main board 410 and can prevent the sensor substrate 512 on which the sensor 511 mounted from being pushed down (e.g., in the second direction (−Z)). Hereafter, various shapes of the supporting member 440 are described in detail with reference to figures.

According to various embodiments, the sensor module 510 may include the sensor 511 and the sensor substrate 512 on which the sensor 511 is disposed. The sensor module 510 can sense the operation state (e.g., power or temperature) in the electronic device 101 or an external environmental state (e.g., a user state) and can produce an electrical signal or a data value corresponding to the sensed state. The sensor 511, for example, may include a gesture sensor, a gyro sensor, a barometer sensor, a magnetic sensor, an acceleration sensor, a grip sensor, a proximity sensor, a color sensor, an IR (Infrared) sensor, a biosensor, a temperature sensor, a humidity sensor, or an illumination sensor. The sensor substrate 512 may include a circuit on which the sensor 511 is mounted and that can produce an electrical signal or a data value corresponding to the state sensed by the sensor 511.

According to an embodiment, in order to provide a configuration in which the sensor 511 and the sensor substrate 512 are stacked, the sensor 511 may be mounted on the front surface facing the first direction (+Z) of the sensor substrate 512. The component connector 421 and the supporting member 440 may be disposed on the rear surface facing the second direction (−Z) of the sensor substrate 512. The component connector 421 may be disposed at least partially in contact with the center portion of the rear surface of the sensor substrate 512 or may be positioned at a predetermined distance. The supporting member 440 may be positioned along the edge regions of the rear surface of the sensor substrate 512 or may be disposed in contact with the rear surface of the sensor substrate 512 and the main board 410.

According to an embodiment, the component connector 421 electrically connected with the main board 410 may be manufactured to maintain the electrical contact even if external shock, etc. are applied. For example, the sensor substrate 512 may be in contact with the front surface of the component connector 421 without being excessively pressed. As another example, the predetermined distance between the sensor substrate 512 and the component connector 421 may be smaller than the thickness of the component connector 421 so that the component connector 421 is not pulled out of the main board 410.

According to an embodiment, the sensor substrate 512 and the supporting member 440 remains bonded in a complete product state, but the sensor substrate 512 and the supporting member 440 may be separably (detachably) coupled so that a user can connect or separate the component connector 421 to or from the main board 410.

According to various embodiments, the bracket 460 can support the entire electronic device 101 and, the display 470 may be coupled to the front surface thereof facing the first direction (+Z) and the main board 410 may be coupled to the rear surface thereof facing the second direction (−Z). The bracket 460 may include a plurality of ribs and/or recesses in which electric components are mounted or an electrical circuit is moved, and at least a portion thereof may have a separation wall to surround the sensor 511.

For example, a first portion 461 of the bracket 460 surrounds the side surfaces of the sensor 511 and can form a first space P1 in which the sensor 511 is mounted in cooperation with the display 470 and the sensor substrate 512. The sensor substrate 512 and the first portion 461 of the bracket 460 may be bonded through a first adhesive member 481. The first adhesive member 481 may be formed in an open loop shape with an open side or a closed loop shape, may be spaced apart from the edges of the sensor substrate 512, and may be coupled to the first portion 461 of the bracket 460.

As another example, a second portion 462 of the bracket 460 can form a second space P2 separated from the first space P1 in which the sensor 511 is disposed. Another electric component may be mounted or a sound channel (e.g., a resonant space) of a speaker 530 may be formed in the second space P2. The second space P2 can be provided by the display 470, the second portion 462 of the bracket 460, and the second adhesive member 482 bonding the display 470 and the bracket 460. The second adhesive member 482 may be formed in a closed loop shape and can seal the second space P2 such that a passage connected to the outside is not formed except for the sound channel of the speaker 530.

Figure 9:
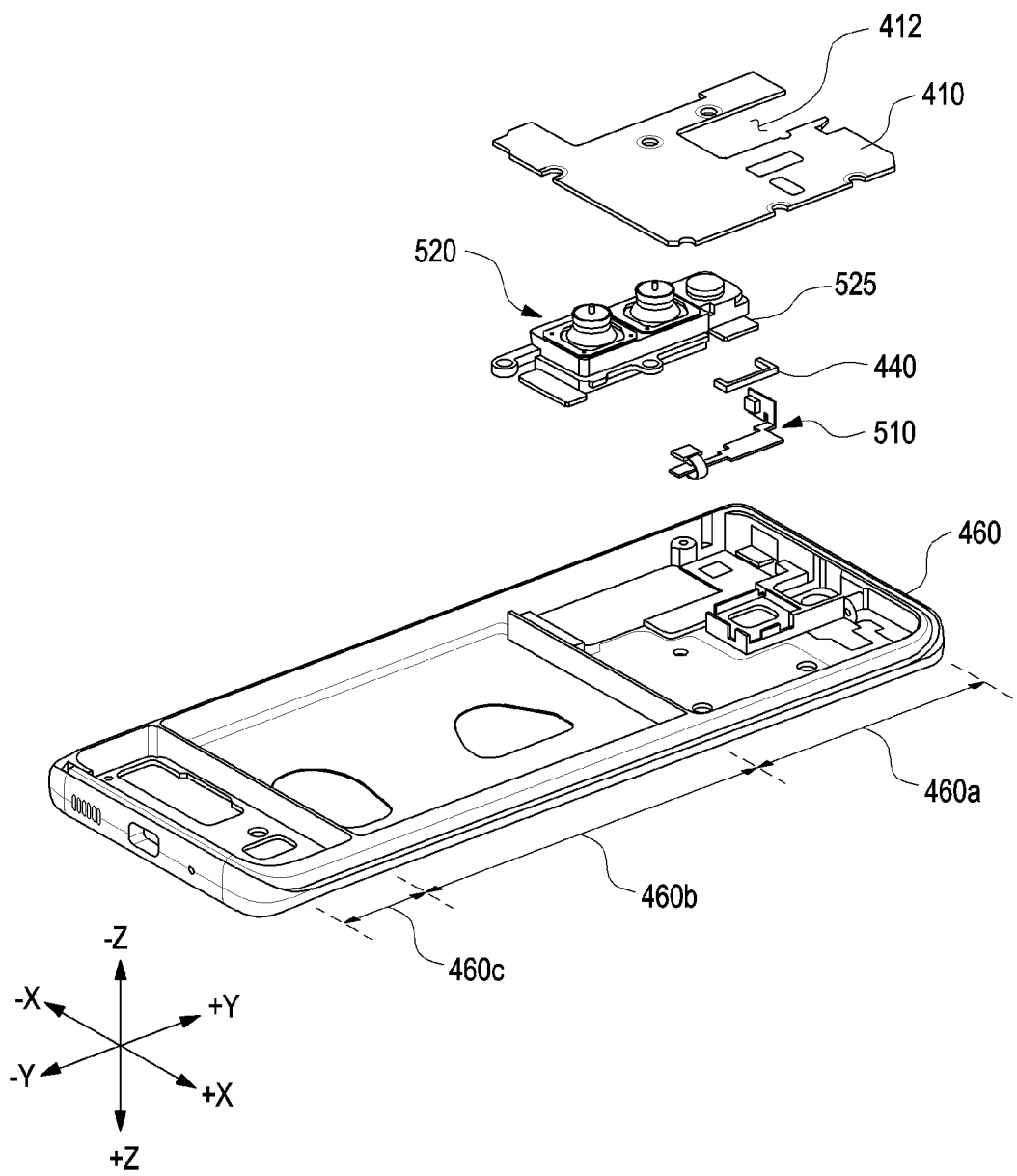
FIG. 9 illustrates an exploded cross-sectional view showing a component stack mounting structure of an electronic device according to various embodiments.
Figure 10:
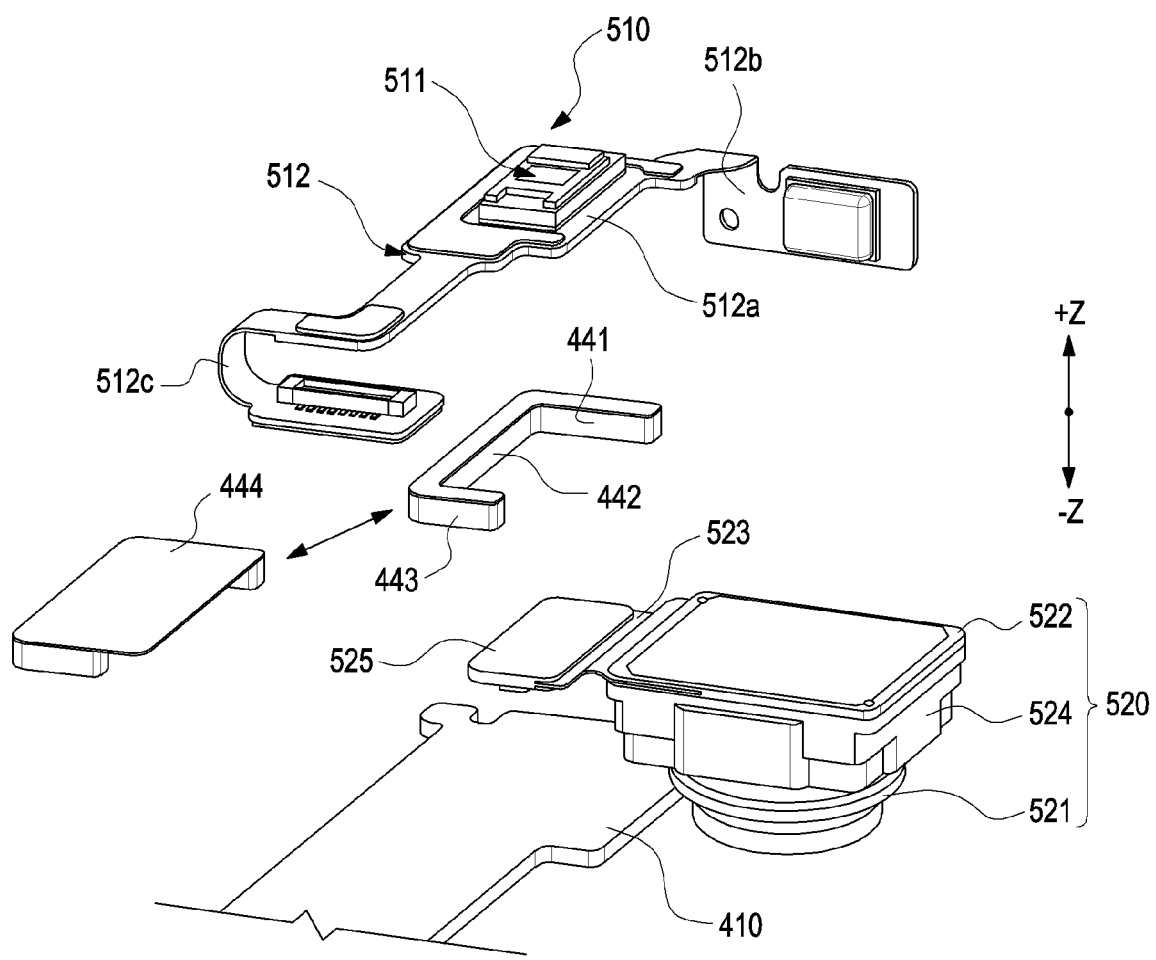
FIG. 10 illustrates an exploded perspective view showing a disposition relationship in the component stack mounting structure shown in FIG. 9.
Figure 11:
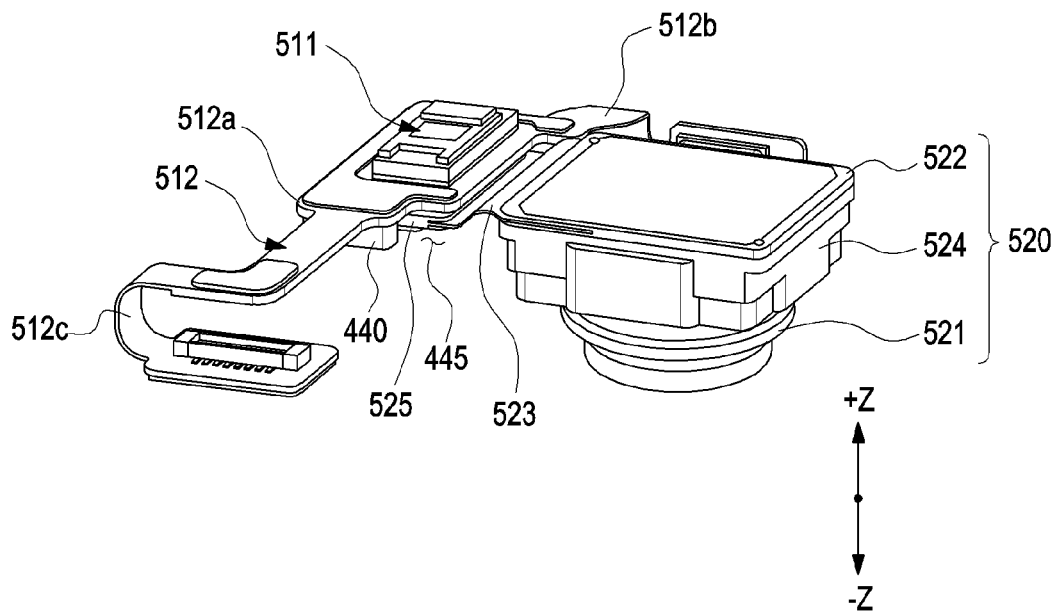
FIG. 11 illustrates a view showing a surface of the component stack mounting structure according to various embodiments.
Figure 12:
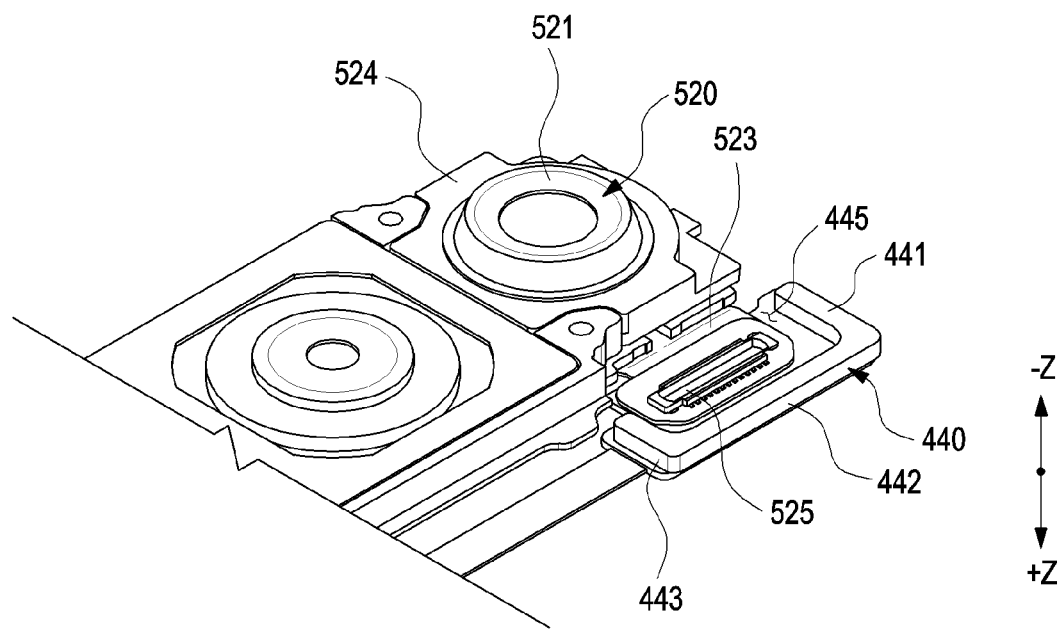
FIG. 12 illustrates a perspective view showing another surface of the component stack mounting structure according to various embodiments.

FIG. 9 illustrates an exploded cross-sectional view showing a component stack mounting structure of an electronic device according to various embodiments. FIG. 10 illustrates an exploded perspective view showing a disposition relationship in the component stack mounting structure shown in FIG. 9. FIG. 11 illustrates a view showing a surface of the component stack mounting structure according to various embodiments. FIG. 12 illustrates a perspective view showing another surface of the component stack mounting structure according to various embodiments.

According to various embodiments, an electronic device (e.g., the electronic device 101 shown in FIGS. 1 to 3) may include a bracket 460, a main board 410 disposed in the upper region (in the +Y direction) of the bracket 460, a camera module 520, a supporting member 440, and a sensor module 510.

The structures of the bracket 460, the main board 410, the supporting member 440, and the sensor module 510 shown in FIGS. 9 to 12 may be partially or entirely the same as the structures of the bracket 460, the main board 410, the supporting member 440, and the sensor module 510 shown in FIG. 7.

According to various embodiments, the bracket 460 can support the entire electronic device 101 and, a display 470 (e.g., the display 470 shown in FIG. 7) may be coupled to the front surface thereof facing the first direction (+Z) and the main board 410 may be coupled to the rear surface thereof facing the second direction (−Z). The bracket 460 can provide a space in which various electric elements and a circuit board are mounted. For example, the camera module 520, the sensor module 510, and a flexible circuit board connecting the camera module 520 and the sensor module 510 may be disposed in the upper region 460*a*, and a battery may be mounted in the intermediate region 460*c*. A microphone, a speaker, and/or a connector for connection with external components may be disposed in the lower region 460*c*.

According to various embodiments, the main board 410 is a printed circuit board including a plurality of stacked substrates, and various circuit wires and a connector may be mounted thereon. The main board 410 has an opening 412 on a side and can provide a space in which a lens assembly and an image sensor, which face the rear surface, of the camera module 520 are positioned.

According to various embodiments, the camera module 520 may include a barrel 521 in which the lens assembly is mounted, a housing 524 accommodating a portion of the barrel 521 and camera components, a substrate 522 on which the image sensor is disposed, a camera circuit board 523 extending to a side of the substrate 522 and facing the main board 410, and a camera connector 525 extending from an end of the camera circuit board 422 (e.g., the component connector 421 shown in FIG. 8). The camera connector 525 may form a contact point together with a connector of the main board 410. The camera circuit board 523 may be a flexible circuit board.

According to various embodiments, a sensor substrate 512 and a sensor module 510 including a sensor 511 may be stacked on a surface facing the first direction (+Z) of the camera connector 525. For example, the sensor substrate 512 may have a first portion 512*a* having a bridge structure and having the sensor 511 mounted thereon, a second portion 512*b* extending from a side of the first portion 512*a* in a direction perpendicular to the first portion 512*a*, and a third portion 512*c* extending from another side of the first portion 512*a*, at least partially bending, and having a connector positioned thereon for electrical connection with the main board 410. The second portion 512*b* and/or the third portion 512*c* extending from the first portion 512*a* may extend in a direction, in which walls of the supporting member 440 are not formed, not to overlap the supporting member 440.

According to an embodiment, the sensor substrate 512 may be a flexible circuit board and a first portion 461 on which the sensor 511 is mounted may have a thickness of 0.2 t or more or may have a rigid portion so that the sensor 511 does not sag in the first direction (+Z) and/or the second direction (−Z).

According to various embodiments, the supporting member 440 may be mounted on a surface facing the second direction (−Z) of the sensor substrate 512 and may have a plurality of walls to surround at least two side surfaces of the camera connector 525. For example, the supporting member 440 may have a first wall 441 having a predetermined thickness and a first length and a second wall 442 having the same thickness as the first wall 441 and a second length, in which the first wall 441 and the second wall 442 may be connected to each other, and the first length and the second length may be different from each other.

As another example, the supporting member 440 may have a first wall 441 having a predetermined thickness and a first length, a second wall 442 having the same thickness as the first wall 441 and a second length, and a third wall 443 having the same thickness as the first wall 441 and a third length, in which the first wall 441, the second wall 442, and the third wall 443 may be connected to each other.

According to an embodiment, the supporting member 440 may have a first wall 441 and a second wall 442 that surround at least two side surfaces of the camera connector 525, and a fourth wall 444 covering the front surface facing the first direction (+Z) of the camera connector 525. The fourth wall 444 may be disposed to face the main board 410 and may be in contact with the camera connector 525 such that the camera connector 525 does not come off in the first direction (+Z) or may be spaced apart from the camera connector 515 such that the camera connector 525 does not come off over a predetermined gap. As another example, an elastic member (e.g., a sponge, a rubber, a polymer (PC, PET), silicon, foam, or a membrane) may be disposed between the fourth wall 444 and the sensor substrate 512, thereby being able to prevent coming-off of the camera connector 525 without strongly pressing the camera connector 525.

According to an embodiment, the supporting member 440 may be formed in a loop shape with at least one side surface of the camera connector 525 open. For example, a first opening 445 of the open region can provide a passage through which a camera circuit board 523 having the camera connector 525 mounted thereon can extend toward the substrate 522.

Figure 13:
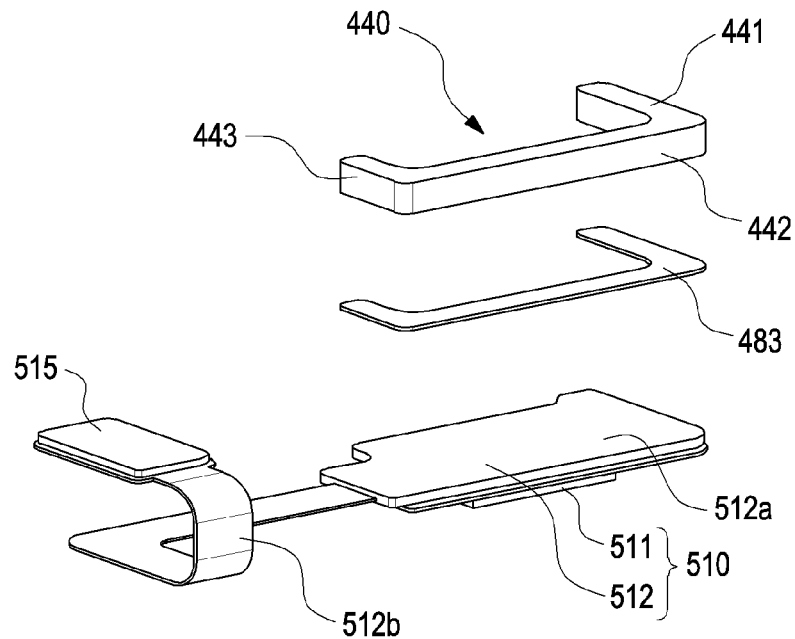
FIG. 13 illustrates an exploded perspective view showing a partial configuration of the component stack mounting structure according to various embodiments.
Figure 14A:
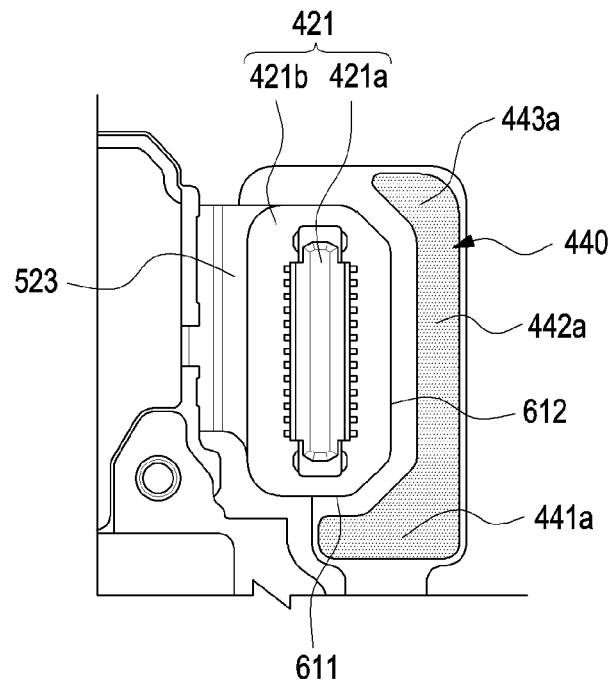
FIG. 14A illustrates a view showing various embodiments of a component stack mounting structure according to various embodiments.
Figure 14B:
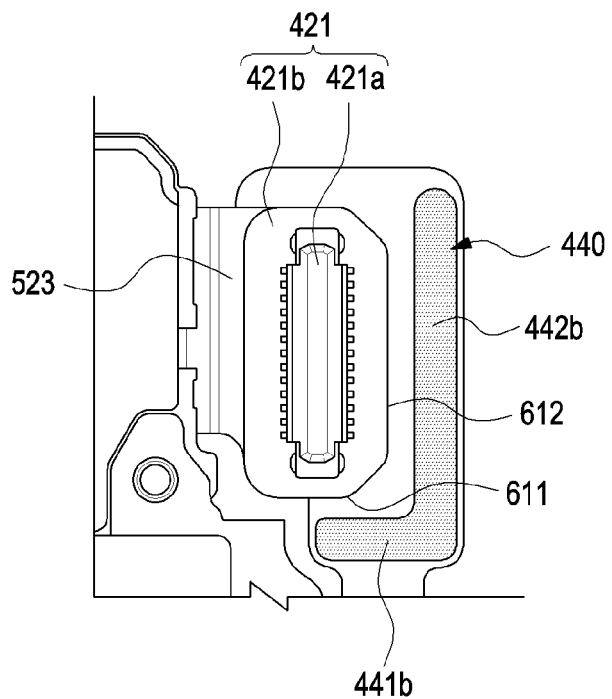
FIG. 14B illustrates a view showing various embodiments of a component stack mounting structure according to various embodiments.
Figure 14C:
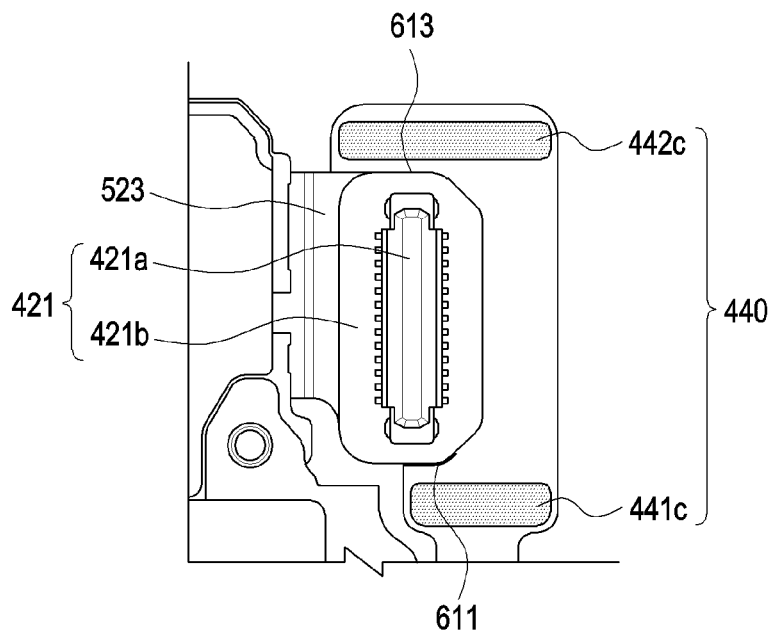
FIG. 14C illustrates a view showing various embodiments of a component stack mounting structure according to various embodiments.

FIG. 13 illustrates an exploded perspective view showing a partial configuration of a component stack mounting structure according to various embodiments. FIGS. 14A to 14C are views showing various embodiments of a component stack mounting structure according to various embodiments.

According to various embodiments, a component stack mounting structure of an electronic device (e.g., the electronic device 101 shown in FIGS. 1 to 3) may include a sensor 511, a sensor substrate 512, a supporting member 440, a component connector 421, and an adhesive member (e.g., a third adhesive member 483).

The structures of the sensor module 510 shown in FIGS. 13 and 14A to 14C (e.g., the sensor 511 and the sensor substrate 512), the supporting member 440, and the component connector 421 may be partially or entirely the same as the structures of the sensor 511, the sensor module 510, the supporting member 440, and the component connector 421 shown in FIG. 8.

Referring to FIG. 13, a supporting member 440, a region of the sensor module 510 separated from the supporting member 440, and the third adhesive member 483 disposed therebetween of the component stack mounting structure are shown. For example, the sensor substrate 512 may have a first portion 512a on which the sensor 511 is mounted and a second portion 512b extending from the first portion 512a and having a sensor connector 515 positioned thereon. The supporting member 440 having a predetermined thickness may be bonded to a surface of the first portion 512a (e.g., the opposite surface to the surface on which the sensor 511 is disposed), and for this configuration, the third adhesive member 483 may be disposed between the first portion 512a and the supporting member 440. The supporting member 440 may be made of a metallic material and/or a non-metallic material (e.g., a polymer or a rubber), may be formed along the edges of the first portion 512a, and may support the entire region of the sensor substrate 512 in which the sensor 511 is mounted.

According to an embodiment, the supporting member 440 may have a first wall 441, a second wall 442, and a third wall 443 extending in different directions. The third adhesive member 483 is manufacture to correspond to the shape of the supporting member 440, thereby being able to increase the adhesive force between the sensor substrate 512 and the supporting member 440.

FIGS. 14A to 14C show various shapes of the supporting member 440. The component connector 421 shown in FIGS. 14A to 14C may include a substrate 421b and a connector member 421a mounted on the substrate 421b.

Referring to FIG. 14A, the supporting member 440 may have a plurality of walls surrounding at least two side surfaces of the component connector 421 and an opening for guiding a passage of a flexible circuit board 523 extending to a region from the substrate 421b. The supporting member 440 may be spaced apart from the connector member 421a or the substrate 421b of the component connector 421 in a shape corresponding to a side line of the connector member 421a or the substrate 421b. For example, the supporting member 440 may have a first wall 441a spaced apart from a first edge 611 (e.g., a transverse line) of the substrate 421b, a second wall 442a extending from an end of the first wall 441a and spaced apart from a second edge 612 (e.g., a longitudinal line) of the substrate 421b, and a third wall 443a extending from an end of the second wall 442b and spaced apart from a third edge (e.g., another transverse line) of the substrate 421b. As another example, the supporting member 440 may be manufactured in a U-shape with an open side.

Referring to FIG. 14B, the supporting member 440 may have a plurality of walls surrounding at least two side surfaces of the component connector 421 and an opening for guiding a passage of a flexible circuit board 523 extending to a region from the substrate 421b. The supporting member 440 may be spaced apart from the connector member 421a or the substrate 421b of the component connector 421 in a shape corresponding to a side line of the connector member 421a or the substrate 421b. For example, the supporting member 440 may have a first wall 441b spaced apart from a first edge 611 (e.g., a transverse line) of the substrate 421b and a second wall 442b extending from an end of the first wall 441a and spaced apart from a second edge 612 (e.g., a longitudinal line) of the substrate 421b. As another example, the supporting member 440 may be manufactured in an L-shape.

Referring to FIG. 14C, the supporting member 440 may have a plurality of walls surrounding at least two side surfaces of the component connector 421 and an opening for guiding a passage of a flexible circuit board 523 extending to a region from the substrate 421b. The supporting member 440 may be spaced apart from the connector member 421a or the substrate 421b of the component connector 421 in a shape corresponding to a side line of the connector member 421a or the substrate 421b. For example, the supporting member 440 may have a first wall 441c spaced apart from a first edge 611 (e.g., a transverse line) of the substrate 421b and a second wall 442c being parallel with the first wall 441c and spaced apart from a third edge 613 (e.g., another transverse line) of the substrate 421b.

According to various embodiments, the supporting member 440 is exemplified in three shapes, but is not limited thereto and may be changed in other shapes to partially cover at least two side surfaces of the component connector 421 positioned in the supporting member 440 and to have different lengths.

An electronic device according to various embodiments (e.g., the electronic device 101 shown in FIGS. 1 to 3) may include a display (e.g., 470 in FIG. 8), a main board (e.g., 410 in FIG. 8) disposed under the display, a component connector (e.g., 421 in FIG. 8) disposed on a surface of the main board, a supporting member (e.g., 440 in FIG. 8) surrounding at least two side surfaces of the component connector and disposed on the surface of the main board, and a sensor module (e.g., 510 in FIG. 8) including a sensor (e.g., 511 in FIG. 8) facing at least a portion of the component connector and a sensor substrate (e.g., 512 in FIG. 8) stacked with the sensor and attached to the supporting member. The sensor substrate may be separably connected to the supporting member.

According to various embodiments, the electronic device may further include a bracket (e.g., 460 in FIG. 8) for forming a first space (e.g., P1 in FIG. 8) in which the sensor is positioned and a second space (e.g., P2 in FIG. 8) partitioned from the first space and adjacent to the sensor.

According to various embodiments, the electronic device may further include a first adhesive member (e.g., 481 in FIG. 8) disposed between the bracket and the sensor substrate to fix the position of the sensor disposed in the first space.

According to various embodiments, the electronic device may further include a second adhesive member (e.g., 482 in FIG. 8) disposed between the display and the bracket to seal at least a portion of the second space.

According to various embodiments, the supporting member may include at least one opening formed in a region corresponding to the front surface or a side surface of the component connector.

According to various embodiments, the supporting member (e.g., 440 in FIG. 10) may have a first wall (e.g., 441 in FIG. 10) formed along a first side surface of the component connector, a second wall (e.g., 442 in FIG. 10) formed along a second side surface of the component connector, and a first opening (e.g., 445 in FIG. 10) corresponding to at least a portion of a third side surface of the component connector, in which a circuit board (e.g., 523 in FIG. 10) extending from the component connector may pass through the first opening.

According to various embodiments, the supporting member (e.g., 440 in FIG. 10) may include a first wall (e.g., 441 in FIG. 10) formed along a first side surface of the component connector, a second wall (e.g., 442 in FIG. 10) formed along a second side surface of the component connector, a third wall (e.g., 443 in FIG. 10) formed along a third side surface of the component connector and extending from the first wall or the second wall, and a first opening (e.g., 445 in FIG. 10) corresponding to at least a portion of a fourth side surface of the component connector, in which a circuit board (e.g., 523 in FIG. 10) extending from the component connector may pass through the first opening.

According to various embodiments, the supporting member may be open at least a portion of a front surface facing a first direction (e.g., +Z in FIG. 8), and a front surface facing the first direction of the component connector and a rear surface of the sensor substrate may substantially face each other.

According to various embodiments, the height of the supporting member may be the same as or larger than the height of the component connector.

According to various embodiments, the component connector and the sensor substrate may be spaced a predetermined distance from each other.

According to various embodiments, the electronic device may further include a third adhesive member (e.g., 483 in FIG. 13) disposed between the supporting member and the sensor substrate. The supporting member and the third adhesive member may support edge regions of the sensor substrate and may maintain the space in which the connector component is positioned such that the connector component does not move a predetermined distance or more in the first direction.

According to various embodiments, the sensor and the component connector may be disposed in an upper region (e.g., 460a in FIG. 9) of the display when seen from the front surface of the display.

According to various embodiments, the sensor may include at least one of an illumination sensor, a biosensor, a temperature sensor, a humidity sensor, a magnetic sensor, an acceleration sensor, a grip sensor, a proximity sensor, a color sensor, and an IR (Infrared) sensor.

According to various embodiments, the component connector may include a camera connector connecting a camera module to a main board.

An electronic device according to various embodiments may include: a housing (e.g., the housing 310 in FIG. 2 and the bracket 460 in FIG. 5); a display (e.g., 470 in FIG. 5) disposed in the housing and including a first surface facing a first direction (e.g., +Z in FIG. 5) and a second surface facing a second direction (e.g., −Z in FIG. 5) that is an opposite direction to the first direction; a first plate (e.g., the main board 410 in FIG. 5) disposed to face the second surface of the display and including a third surface facing the first direction; a connector (e.g., the connection member 420 in FIG. 5) disposed on the third surface of the first plate; a supporting member (e.g., the supporting member 440 in FIG. 5) disposed on the third surface to surround at least a portion of the connector; a sensor (e.g., the electric component 450 in FIG. 5) facing at least a portion of the connector; and a second plate (e.g., the substrate 430 in FIG. 5) disposed between the sensor and the supporting member, in which the second plate may be separable from the supporting member.

According to various embodiments, a first portion of the housing may be coupled by a first adhesive member disposed on the second plate, and the first portion, the first adhesive member, and the second plate may provide a first space in which the sensor is mounted.

According to various embodiments, the second surface of the display may be coupled to a second portion of the housing by a second adhesive member, and the second portion, the second adhesive member, and the display may provide a second space including a sound channel of a speaker or a receiver.

According to various embodiments, the second plate and the supporting member may be bonded by a third adhesive member (e.g., the third adhesive member 483 in FIG. 13).

An electronic device according to various embodiments may include: a main board (e.g., 410 in FIG. 5); a connection member (e.g., 420 in FIG. 5) disposed on a surface of the main board and electrically connected with the main board; a substrate (e.g., 430 in FIG. 5) disposed on or above the connection member; a supporting member (e.g., 440 in FIG. 5) disposed on the surface of the main board to surround at least two side surfaces of the connection member and supporting the substrate; and an electric component (e.g., 450 in FIG. 5) disposed on the substrate and electrically connected with the substrate.

According to various embodiments, the substrate and the supporting member may be separably connected.

According to various embodiments, the electronic device may further include a bracket (e.g., 460 in FIG. 8) coupled on the substrate by a first adhesive member, in which a first portion (e.g., 461 in FIG. 8) of the bracket, the first adhesive member, and the substrate may provide a first space (e.g., P1 in FIG. 8) in which the electric component is mounted.

According to various embodiments, the electronic device may further include a display coupled on the bracket by a second adhesive member, in which a second portion (e.g., 462 in FIG. 8) of the bracket, the second adhesive member, and the display may provide a second space (e.g., P2 in FIG. 8) having a sound channel for a speaker or a receiver. An electronic device according to various embodiments may include: a display (e.g., 470 in FIG. 8); a printed circuit board (e.g., 410 in FIG. 8) disposed under the display and including a first section (e.g., S1 in FIG. 5) in which a connector (e.g., 411 in FIG. 8) is formed and a second section (e.g., S2 in FIG. 5) formed around the first section; a camera connector (e.g., 525 in FIG. 11) disposed between the display and the printed circuit board and electrically coupled to the connector disposed in the first section; a supporting member (e.g., 440 in FIG. 8) including at least two walls disposed in the second section and spaced apart from the camera connector to surround at least two side surfaces of the camera connector and a first opening configured to provide a passage of a flexible circuit board (523 in FIG. 8) extending from the camera connector; a sensor substrate (e.g., 512 in FIG. 8) disposed on the camera connector and the supporting member and bonded to the supporting member; a sensor (e.g., 511 in FIG. 8) coupled on the sensor substrate and facing the display; a bracket (e.g., 460 in FIG. 8) forming a first space (e.g., P1 in FIG. 8) in which the sensor is disposed and a second space (e.g., P2 in FIG. 8) separated from the first space and adjacent to the sensor; and an adhesive member (e.g., 482 in FIG. 8) bonded to the bracket around the second space to seal at least a portion of the second space.

According to various embodiments, the supporting member may include a first wall spaced apart along a first side surface of the camera connector, a second wall spaced apart along a second side surface of the camera connector, a third wall spaced along a third surface of the camera connector and extending from the first wall or the second wall, and a second opening corresponding to at least a portion of a front surface of the camera connector.

Component stack mounting structures and electronic devices including the component stack mounting structure according to various embodiments described above are not limited to the embodiments and drawings described above and it would be apparent to those skilled in the art that the electronic devices may be replaced, changed, and modified in various ways within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a display;
a main board disposed under the display;
a component connector disposed on a surface of the main board;
a supporting member configured to surround at least two side surfaces of the component connector and disposed on the surface of the main board; and
a sensor module including a sensor facing at least a portion of the component connector and a sensor substrate stacked with the sensor and attached to the supporting member,
wherein the sensor substrate is separably connected to the supporting member.

2. The electronic device of claim 1, further comprising a bracket configured to form a first space in which the sensor is positioned and a second space partitioned from the first space and adjacent to the sensor.

3. The electronic device of claim 2, further comprising a first adhesive member disposed between the bracket and the sensor substrate to fix a position of the sensor disposed in the first space.

4. The electronic device of claim 2, further comprising a second adhesive member disposed between the display and the bracket to seal at least a portion of the second space.

5. The electronic device of claim 1, wherein the supporting member includes at least one opening formed in a region corresponding to a front surface or a side surface of the component connector.

6. The electronic device of claim 1, wherein the supporting member comprises:
a first wall formed along a first side surface of the component connector;
a second wall formed along a second side surface of the component connector; and
a first opening corresponding to at least a portion of a third side surface of the component connector, and
wherein a circuit board extending from the component connector passes through the first opening.

7. The electronic device of claim 1, wherein the supporting member includes:
a first wall formed along a first side surface of the component connector;
a second wall formed along a second side surface of the component connector;
a third wall formed along a third side surface of the component connector and extending from the first wall or the second wall; and
a first opening corresponding to at least a portion of a fourth side surface of the component connector, and
wherein a circuit board extending from the component connector passes through the first opening.

8. The electronic device of claim 5, wherein:
the supporting member is open at least a portion of the front surface facing a first direction, and
the front surface facing the first direction of the component connector and a rear surface of the sensor substrate substantially face each other.

9. The electronic device of claim 8, wherein a height of the supporting member is the same as or larger than the height of the component connector.

10. The electronic device of claim 8, wherein the component connector and the sensor substrate are spaced a predetermined distance from each other.

11. The electronic device of claim 1, further comprising a third adhesive member disposed between the supporting member and the sensor substrate,
wherein the supporting member and the third adhesive member support edge regions of the sensor substrate and maintain a space in which the component connector is positioned such that the component connector is prevented from moving a predetermined distance or more in a first direction.

12. The electronic device of claim 2, wherein the sensor and the component connector are disposed in an upper region of the display when seen from a front surface of the display.

13. The electronic device of claim 1, wherein the sensor includes at least one of an illumination sensor, a biosensor, a temperature sensor, a humidity sensor, a magnetic sensor, an acceleration sensor, a grip sensor, a proximity sensor, a color sensor, and an IR (Infrared) sensor.

14. The electronic device of claim 1, wherein the component connector includes a camera connector connecting a camera module to the main board.

15. An electronic device comprising:
a housing;
a display disposed in the housing and including a first surface facing a first direction and a second surface facing a second direction that is an opposite direction to the first direction;
a first plate disposed to face the second surface of the display and including a third surface facing the first direction;
a connector disposed on the third surface of the first plate;
a supporting member disposed on the third surface to surround at least a portion of the connector;
a sensor facing at least a portion of the connector; and
a second plate disposed between the sensor and the supporting member,
wherein the second plate is disposed to be separable from the supporting member.

16. The electronic device of claim 15, wherein:
a first portion of the housing is coupled by a first adhesive member disposed on the second plate, and
the first portion, the first adhesive member, and the second plate provide a first space in which the sensor is mounted.

17. The electronic device of claim 15, wherein:
the second surface of the display is coupled to a second portion of the housing by a second adhesive member, and
the second portion, the second adhesive member, and the display provide a second space including a sound channel of a speaker or a receiver.

18. The electronic device of claim 15, wherein the second plate and the supporting member are bonded by a third adhesive member.

19. An electronic device comprising:
a display;
a printed circuit board disposed under the display and including a first section in which a connector is formed and a second section formed around the first section;
a camera connector disposed between the display and the printed circuit board and electrically coupled to the connector disposed in the first section;
a supporting member including at least two walls disposed in the second section and spaced apart from the camera connector to surround at least two side surfaces of the camera connector and a first opening configured to provide a passage of a flexible circuit board extending from the camera connector;
a sensor substrate disposed on the camera connector and the supporting member and bonded to the supporting member;
a sensor coupled on the sensor substrate and facing the display;
a bracket configured to form a first space in which the sensor is disposed and a second space separated from the first space and adjacent to the sensor; and
an adhesive member bonded to the bracket around the second space to seal at least a portion of the second space.

20. The electronic device of claim 19, wherein the supporting member comprises:
a first wall spaced apart along a first side surface of the camera connector;
a second wall spaced apart along a second side surface of the camera connector;
a third wall spaced along a third surface of the camera connector and extending from the first wall or the second wall; and
a second opening corresponding to at least a portion of a front surface of the camera connector.

* * * * *